United States Patent Office 2,707,152
Patented Apr. 26, 1955

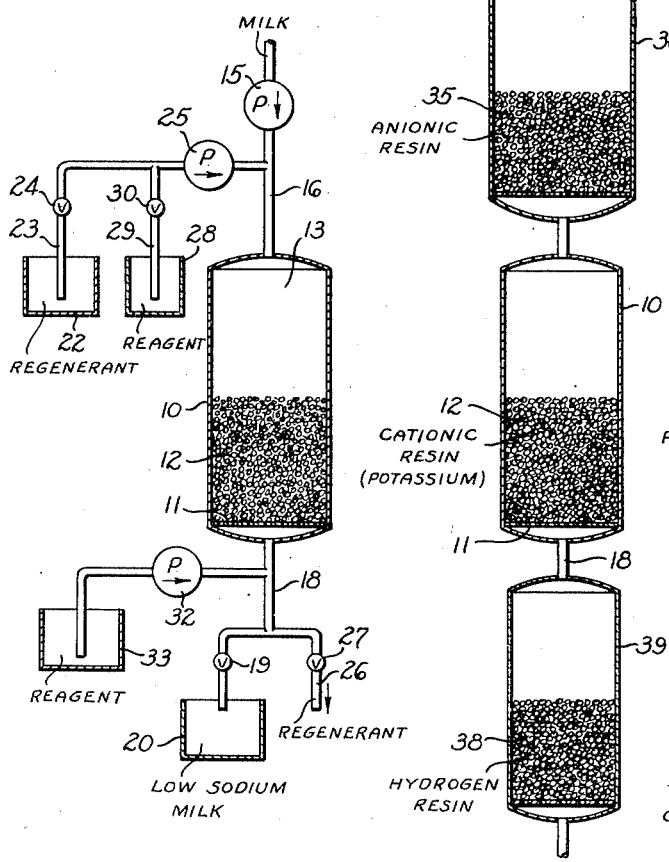
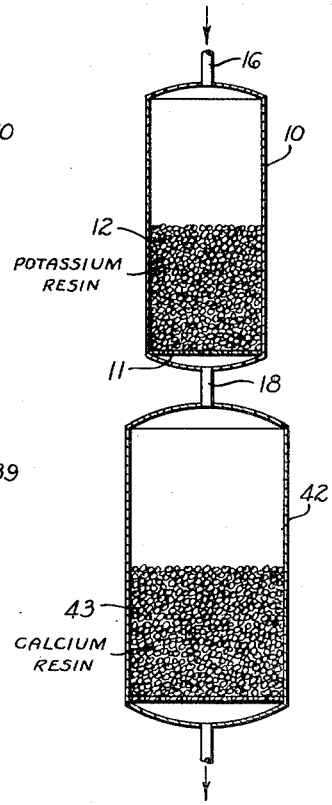

2,707,152

LOW-SODIUM MILK AND PROCESSES FOR PRODUCING SAME

Albert L. Chaney, Glendale, and Kenneth D. Johnson, Montrose, Calif.; said Johnson assignor to said Chaney Application January 30, 1951, Serial No. 208,616

8 Claims. (Cl. 99—54)

Our invention relates to a low-sodium milk and to a novel process of producing same by an ion-exchange process.

For special dietetic purposes, e. g., in cases involving certain heart ailments and kidney and liver diseases, it is desirable to reduce the sodium content of milk from its normal value of about 60 mg./100 cc. to about 5–10 mg./100 cc. or lower. A corresponding increase in the normal potassium or calcium content of the milk has been found to be unobjectionable. The normal mineral composition of milk is given in the following table:

| Mineral | Mg./100 cc. | Milliequivalents/liter |
|---|---|---|
| Sodium | 60 | 26.1 |
| Potassium | 150 | 38.3 |
| Calcium | 125 | 63.0 |
| Magnesium | 14 | 11.5 |

The normal pH of milk is about pH 6.0–7.0.

We have found that the sodium content of milk can be economically reduced by the ion-exchange process, and it is an object of the invention to provide several ion-exchange processes individually or collectively useful in this connection.

Another object is to employ a process of producing a low-sodium milk which accentuates a sodium-potassium ion exchange while minimizing or preventing any net reduction in calcium content by use of an appropriate ion-exchange medium or by pretreatig and/or post treating the milk.

A further object is to produce a low-sodium milk which is not bluish or watery in appearance and which is identical with or closely approximates untreated milk in appearance.

While some embodiments of the invention may involve a change in pH of the milk, it is an object of the invention to produce a low-sodium milk having a pH identical with or closely approximating the pH of untreated milk.

A further object is to employ a low-sodium milk process which is operative at room temperature or below or which can be operated at milk-pasteurizing temperatures to effect sodium reduction and pasteurization simultaneously if desired.

Other objects and advantages will be evident to those skilled in the ion-exchange art from the various examples of the process hereinafter enumerated.

Referring to the drawing:

Fig. 1 illustrates one simple type of ion-exchange equipment useful in carrying out the process of the invention, and Figs. 2 and 3 respectively illustrate diagrammatically alternative equipment that may be used in carrying out the processes of the invention.

In Fig. 1 is shown a tank 10 which is usually several feet high but much smaller in diameter, a tank 5' high and 6" diameter containing 1 cu. ft. of ion-exchange material being usually sufficient to process about 30 gal./hr. of milk, giving a time of contact of about 8 minutes. The tank 10 is preferably formed of easily sterilized metal such as stainless steel and is equipped with a porous plate 11 of the same or other material which supports a body of ion-exchange material 12 above which is a fluid space 13.

The milk to be treated, either pasteurized or raw and usually in skim-milk form, is advanced by a pump 15 or any pressure source to flow along an influent pipe 16 opening on the top of the tank 10 to fill the fluid space 13, displacing any other fluid therein, and then flowing downward through the ion-exchange body 12 and from an effluent pipe 18 through a valve 19 to a collecting tank 20.

The ion-exchange material forming the body 12 is preferably a cation exchange resin of fairly high ion-exchange capacity, usually in the form of small beads of about 40–300 mesh. Various condensation products of phenol sulfonic acid may be used, these being highly insoluble and resistant to all types of acids, alkalis or other chemicals. The beads are porous and provide internal and external surfaces having sulfonic acid groups in which the H is ionizable and which may directly produce some exchange between Na+ in solution and the H+, although not to the extent possible by first converting the resin to the potassium form. By way of example, the initial resin may be "IR-100," "IR-120," "Ionac C-200" (modified phenol formaldehyde sulfonic acid resins), "Dowex-50" (a sulfonated polystyrene resin), "IRC-50" (a carboxyl-group resin), etc.

The initial resin (HR) can be converted to the potassium form (KR) by flowing any suitable potassium solution such as potassium chloride from a regenerant tank 22 through a pipe 23, a valve 24 and a pump 25 to the top of the tank 10, e. g., through the influent pipe 16. Downward flow through the ion-exchange resin will convert this material to the potassium form in accordance with the equation:

$$K^+ + H^+R \rightleftharpoons K^+R + H^+$$

producing an HCl effluent which flows from the pipe 18 through a branch pipe 26 and its valve 27.

With such a converted resin, subsequent pumping of skim milk through the tank 10 will result not only in desirable sodium-potassium exchange but also in an undesirable calcium-potassium exchange. Removal of calcium will greatly alter the appearance of the milk, making it blue and translucent or watery appearing. It has been found, however, that the calcium-potassium exchange depends on the pH of the milk. The calcium is only partly ionized in the milk and the equivalent ionic concentration thereof is less than would be expected from the above table of milk composition. Adding acid to the milk greatly increases the percentage of ionized calcium. Adding alkali to the milk, to bring it to pH 8 or higher, will decrease the ionized calcium (by combining it with the casein of the milk) and will decrease the undesirable calcium-potassium exchange but will again make the milk blue and watery in appearance. A process operating on these general principles and correcting for their deficiencies is as follows:

Process 1

An aqueous alkali solution, typically potassium hydroxide, is pumped from a reagent tank 28 through a pipe 29 as controlled by a valve 30, this alkaline solution joining and mixing with the milk in the pipe 16. Sufficient alkali will be used to bring the milk to about pH 8.0–8.5 and the ion exchange will be primarily sodium-potassium in accordance with the formula:

$$Na^+ + K^+R \rightleftharpoons Na^+R + K^+$$

Any calcium-potassium exchange will be negligible and the undesirable appearance of the milk can be removed by using a pump 32 to pump sufficient acidic material from a tank 33 into the effluent pipe 18 to bring the pH of the milk to its initial value. This acidic material may be HCl, lactic acid or any other suitable acid. The resultant normal-appearing and normal-tasting milk will discharge into the tank 20, reduced to any desired extent in sodium and correspondingly enriched in potassium.

The first milk entering the tank 20 will be substantially sodium-free but continuance of the process will gradually lower or deplete the effective zone of sodium-potassium exchange, producing a progressive diminution of the above reaction and a milk of progressively increasing sodium content. When the milk in the tank 20 reaches the desired average low-sodium content, the milk flow is stopped and the resin reactivated. Preferably the interior of the tank 10 is first rinsed and backwashed with an anionic or non-ionic detergent to remove protein, etc., and suitable sterilization steps can be performed at this time. It is then regenerated to its potassium form as my pumping a suitable potassium regenerant from the tank 22 through the tank 10 and from the branch pipe 26. Thereafter, another charge of milk can be supplied, as before.

In this process the total potassium content of the milk is increased by an amount equal to the replaced sodium and the total salt content is increased due to any potassium added initially to change the pH of the milk and later converted to lactate or chloride, for example, in the acidulation step. These changes are usually not objectionable and the above-described process has a relatively high capacity, usually about 75 gal., before regeneration is required.

*Process 2*

This process has the advantages of Process 1 but eliminates the successive additions of alkali and acid. Referring to Fig. 2, the milk is initially alkalinized to a pH of about 8.0–8.5 by flow through a bed 35 of anionic resin in hydroxide form, present in a tank 36 interposed in the pipe 16. The anionic resin may be a strong base (poly-amine) anion exchange resin such as "IRA–400" or "Dowex-2" regenerated by a sodium or potassium hydroxide to the hydroxyl form and acting on the milk by replacing enough chloride by hydroxide to raise the pH as desired. The resulting milk then flows through the body 12 of cationic resin in the tank 10 and is acidified to normal pH by being passed through a bed 38 of hydrogen resin in a tank 39 interposed in the pipe 18. Suitable regenerants may be severally sent through the tanks 10, 36 and 38 to regenerate the resins to desired form. By this process, the total salt content of the processed milk is less than in Process 1 since the steps involving initial addition of potassium hydroxide and its later neutralization by acid are omitted.

*Process 3*

This modification can be performed in the equipment of Fig. 1. The skim milk is pumped at natural pH through the body of potassium resin in the tank, as previously described. By ion exchange the resin removes say 25 milliequivalents of sodium and 55 of calcium, increasing the potassium content to about 118 milliequivalents. The calcium removal changes the appearance of the milk which is brought back to normal by the addition of calcium. For example, a solution of calcium lactate or calcium chloride may be introduced into the milk from the reagent tank 33 by control of the pump 32. Unless the normal calcium content of the untreated milk is to be fully restored, which is usually not necessary, the amount of calcium added need be only enough to restore the appearance of the milk.

*Process 4*

Fig. 3 shows diagrammatically an apparatus useful in this modification. The milk is passed downwardly through the aforesaid potassium resin body 12 in the tank 10 with the result that both sodium and calcium are removed. To restore the appearance and at least a part of the calcium content, the milk is passed through a tank 42 where it is subjected to a calcium-potassium ion exchange either by a batch equilibrium step or by flow through a body 43, in either instance employing a calcium resin, e. g., a cation exchange resin converted by calcium chloride or other soluble calcium salt to calcium form. As the calcium-potassium exchange is of relatively lower efficiency than the exchange in the body 12, the tank 42 and the body 43 are preferably larger than the tank 10 and the body 12. By this process the original composition of the milk, except for low-sodium content, can be closely approximated.

*Process 5*

By this modification very excellent results can be obtained by use of simple equipment. Using the apparatus of Fig. 1, the body 12 is converted to a mixed potassium and calcium resin by a potassium-calcium regenerant such as an aqueous solution of potassium chloride and calcium chloride or other soluble potassium and calcium salts. The presence of both potassium and calcium ions in proper relative proportions in the body 12 subdues the calcium removal and effectively limits the exchange to a sodium-potassium one. This is very desirable as no chemical addition is required to correct the appearance of the milk. Aside from the increase in potassium and the corresponding decrease in sodium, due to the above exchange with sodium, the milk composition remains normal without adjustment of pH or any chemical addition such as might increase further the salt content of the milk.

It may be pointed out that, when a solution of mixed ions is passed through an exchanger, the divalent ions (e. g., calcium and magnesium) are preferentially taken up by the resin, as compared with the monovalent ions such as sodium (or potassium). This degree of preference is further a function of the concentration of the solution, being greater the more dilute the solution, and may in fact be reversed in very strong solutions.

By this means, it is possible to regulate the composition of the mixed resin by use of potassium chloride regenerant solution only. After the first processing of milk, the resin will contain a mixture of the sodium, potassium and calcium forms. If a very strong potassium chloride regenerant is used (e. g., 10% or stronger), both sodium and calcium will be readily removed from the resin. If a weaker solution is used (e. g., of the order of 1–5%), sodium may be selectively replaced, with a minimum of calcium removal, so that the calcium-potassium ratio in the regenerated resin may be effectively regulated. The calcium-potassium ratio in the regenerated resin should preferably be within the limits of about 0.2–0.5 on a milliequivalent concentration basis. If the calcium content is too low, too much calcium will be removed from the milk. If it is too high, the capacity of the resin for treatment of milk will be very low.

In any of the foregoing processes it is desirable that the resulting low-sodium milk should be of a chemical composition in mg./100 cc. within the following approximate ranges: sodium about 5-10, potassium about 225–300, calcium about 75–200 and magnesium about 5–14.

Any of the above processes can be carried out at room temperature. However, it is distinctly preferable to operate at lower or higher temperatures. For example, an operational temperature below 10° C. is desirable to minimize bacterial growth. Alternatively, however, it is within the contemplation of the invention that at least a portion of the tank 10 or the body 12 be maintained at a milk-pasteurizing temperature, usually about 62°–65° C., depending upon the time the milk is subjected to this temperature. In this connection, the invention may receive raw or unpasteurized milk and simultaneously effect pasteurization and ion exchange. At least a part of the pasteurizing treatment will thus be effected during passage of the milk through the body of resin 12. In this process the milk may be heated either before or after entering the top of the tank and/or the body of resin 12 may be heated to the desired pasteurizing temperature.

Various changes and modifications will be evident to those skilled in the art from the exemplary processes herein outlined, such changes and modifications being comprehended as a part of the invention if within the scope of the appended claims.

We claim as our invention:

1. A process for reducing the sodium content of natural milk to produce a low-sodium milk for dietetic purposes, comprising: flowing said milk through a body of synthetic potassium ion exchange resin and directly replacing a major proportion of the sodium present in said milk with potassium, maintaining the pH value of the milk during processing to retard the replacement of a significant amount of the calcium present in said milk with potassium, and obtaining a low-sodium milk product having substantially the pH value and the calcium content of the original milk.

2. A process for reducing the sodium content of milk to produce a low-sodium milk for dietetic purposes, comprising raising the pH of said milk to 8.0–8.5; flowing said milk at said pH value through a body of synthetic potassium ion exchange resin and replacing a major proportion of the sodium present in said milk with potassium, with said elevated pH preventing any substantial replacement of the calcium present in said milk with potassium; and lowering the pH of the treated milk to restore the pH value of the final low-sodium milk product to substantially that of the original milk.

3. A process as defined in claim 2 wherein said raising of the pH is effected by adding potassium hydroxide and the lowering of the pH is effected by adding an acid.

4. A process as defined in claim 2 wherein said raising of said pH is effected by flowing said milk through a body of hydroxyl ion exchange resin and said lowering of the pH is effected by flowing the treated milk through a body of hydrogen ion exchange resin.

5. A process for reducing the sodium content of milk to produce a low-sodium milk for dietetic purposes, comprising contacting said milk with a body of synthetic ion exchange resin containing both calcium and potassium exchangeable ions, the calcium-potassium ratio in the resin being within the limits of about 0.2–0.5 on a milliequivalent concentration basis, said calcium ions of said exchange resin preventing any substantial reduction of the calcium present in said milk by exchange with potassium and said potassium ions of said exchange resin directly replacing a major proportion of the sodium present in said milk and obtaining a final low-sodium milk product having substantially the pH value and the calcium content of the original milk; and separating said low-sodium milk from said exchange resin.

6. A process for reducing the sodium content of milk to produce a low-sodium milk for dietetic purposes, comprising flowing said milk through a body of synthetic ion exchange resin containing both calcium and potassium exchangeable ions, the calcium-potassium ratio in the resin being within the limits of about 0.2–0.5 on a milliequivalent concentration basis, said calcium ions of said exchange resin preventing any substantial reduction of the calcium present in said milk by exchange with potassium and said potassium ions of said exchange resin directly replacing a major proportion of the sodium present in said milk and obtaining a final low-sodium milk product having substantially the pH value and the calcium content of the original milk.

7. A process for reducing the sodium content of milk to produce a low-sodium milk for dietary purposes, comprising flowing said milk through a body of synthetic ion exchange resin containing both calcium and potassium exchangeable ions, said exchange resin having been regenerated by contacting a spent ion exchange resin containing potassium, sodium and calcium exchangeable ions with a dilute aqueous solution of about 1–5% of a potassium salt to produce an exchange resin having a calcium-potassium ratio of about 0.2–0.5 on a milliequivalent concentration basis, said calcium ions of said exchange resin preventing any substantial reduction of the calcium present in said milk by exchange with potassium and said potassium ions of said exchange resin directly replacing a major proportion of the sodium present in said milk and obtaining a final low-sodium milk product having substantially the pH value and the calcium content of the original milk.

8. A low-sodium milk for dietetic purposes prepared in accordance with the process defined by claim 5.

References Cited in the file of this patent

UNITED STATES PATENTS

| | | |
|---|---|---|
| 2,102,642 | Otting et al. | Dec. 21, 1937 |
| 2,511,825 | Myers | June 13, 1950 |
| 2,541,568 | Baur et al. | Feb. 13, 1951 |

OTHER REFERENCES

"Readjustment of Salts in Milk, by Base Exchange Treatment" by J. F. Lyman et al. Pages 1–5, page 4 only reprinted from Industrial and Eng. Chemistry, vol. 25, page 1297, Nov. 1933.